United States Patent
Bell et al.

(10) Patent No.: US 9,998,486 B2
(45) Date of Patent: Jun. 12, 2018

(54) SYSTEM FOR UTILIZING ONE OR MORE DATABASES TO IDENTIFY A POINT OF COMPROMISE

(71) Applicant: Bank of America Corporation, Charlotte, NC (US)

(72) Inventors: Kolt Bell, Charlotte, NC (US); Brandon Weeks, Indian Land, SC (US); Alvino Sarran, Nashville, TN (US); Michael Ayers-Morris, Wilmington, DE (US); Alex Stapleton, Charlotte, NC (US); Craig D. Widmann, Chandler, AZ (US); John Tuders, Harrisburg, NC (US); Amijo Bearley, Oxford, PA (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 15/041,792

(22) Filed: Feb. 11, 2016

(65) Prior Publication Data

US 2017/0237759 A1 Aug. 17, 2017

(51) Int. Cl.
*H04L 29/06* (2006.01)
*G06Q 40/02* (2012.01)

(52) U.S. Cl.
CPC ......... *H04L 63/1425* (2013.01); *G06Q 40/02* (2013.01)

(58) Field of Classification Search
CPC .......... G06F 21/00; G06F 21/55; G06F 17/30; G06F 21/552; G06F 17/30371; G06F 17/30528; G06Q 40/00; G06Q 20/04; G06Q 40/02; G06Q 20/4016; H04L 63/1425; H04L 9/00; H04L 12/24; H04L 12/26; H04L 29/08; H04L 43/16; H04L 67/10; H04L 41/0686; H04L 9/0891; H04L 9/12; H04L 9/3268
USPC ........ 705/35; 713/155, 156, 158; 726/22–25
See application file for complete search history.

(56) References Cited

U.S. PATENT DOCUMENTS

| 6,119,103 | A | 9/2000 | Basch et al. |
| 7,480,631 | B1 | 1/2009 | Merced et al. |
| 8,412,605 | B2 | 4/2013 | Griffin et al. |
| 8,504,456 | B2 | 8/2013 | Griffin et al. |
| 8,589,298 | B2 | 11/2013 | Choudhuri et al. |
| 8,626,663 | B2 | 1/2014 | Nightengale et al. |
| 9,117,074 | B2 * | 8/2015 | Srivastava ............ G06F 21/552 |
| 2009/0132404 | A1 * | 5/2009 | King ..................... G06Q 20/04 705/35 |

* cited by examiner

*Primary Examiner* — Thanhnga B Truong
(74) *Attorney, Agent, or Firm* — Banner & Witcoff, Ltd.; Michael A. Springs

(57) ABSTRACT

Systems and computer-readable media are disclosed for utilizing one or more databases to detect a point of compromise ("POC"). A POC detection computing platform may receive data associated with a potential point of compromise from a first computing system. The POC detection computing platform may extract data associated with the potential point of compromise from one or more central servers and/or databases. The extracted data may then be analyzed to determine if a point of compromise has been detected. The POC detection computing platform may transmit the results of the analysis to a second computing system.

16 Claims, 7 Drawing Sheets

SYSTEM FOR UTILIZING ONE OR MORE DATABASES TO IDENTIFY A POINT OF COMPROMISE

CROSS-REFERENCE TO RELATED APPLICATIONS

This application is related to U.S. patent application Ser. No. 15/041,802, filed on Feb. 11, 2016, and entitled "DYNAMIC RECORD IDENTIFICATION AND ANALYSIS COMPUTER SYSTEM WITH EVENT MONITORING COMPONENTS," which is hereby incorporated by reference herein in its entirety.

BACKGROUND

Aspects of the disclosure relate to computer hardware and software. In particular, one or more aspects of the disclosure generally relate to utilizing one or more databases to determine a point of compromise.

If data is compromised at an enterprise organization, an institution that stores the data within one or more internal databases may not become aware of the compromise until long after the compromise has already occurred. That is, once the data has been compromised, institutions are unaware of the breach unless an individual associated with the compromised data detects the breach and notifies the institution. Additionally, if the enterprise organization is unaware of the compromise, the institution will be unable to locate the point of compromise for the data.

Therefore, it may be advantageous to detect a point of compromise as soon as it occurs, thus preventing any further unauthorized utilization of the compromised data. A point of compromise detection system may include one or more databases that stores information on points of compromise that have been detected by the point of compromise detection system. The point of compromise detection system may receive data related to a potential point of compromise. The point of compromise detection system may utilize the one or more databases to detect a point of compromise based on the received data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to various systems and techniques that provide effective, efficient, and convenient ways of utilizing one or more databases to determine a point of compromise. In at least some aspects, determining a point of compromise may comprise performing a first point of compromise analysis and a second point of compromise analysis. The first point of compromise analysis and the second point of compromise analysis may be performed in parallel or sequentially.

Aspects of the disclosure relate to enabling or configuring one or more computer systems of an enterprise organization to receive, from a first computing device, a potential compromise event and a first set of data associated with the potential compromise event. The one or more computer systems of the enterprise organization may extract, from a central server, a second set of data that is associated with the potential compromise event and compare the first set of data and the second set of data with a third set of data that is stored in a central database to generate a first subset of data and a second subset of data. The one or more computer systems of the enterprise organization may perform a first point of compromise analysis on the first subset of data and the third set of data that is stored in the central database and may perform a second point of compromise analysis on the second subset of data. The one or more computer systems of the enterprise organization may output, to a second computing device, a first notification including a first result of the first point of compromise analysis and a second notification including a second result of the second point of compromise analysis.

For example, in accordance with one or more aspects of the disclosure, the first set of data, the second set of data, and the third set of data may each include a list of one or more devices. In accordance with additional aspects of the disclosure, comparing the first set of data and the second set of data with a third set of data to generate the first subset of data and the second subset of data may include determining a first list of devices, wherein each device in the first list of devices is stored in the third set of data and at least one of the first set of data and the second set of data, determining a second list of devices, wherein each device in the second list of devices is stored in at least one of the first set of data and the second set of data, but is not stored in the third set of data, storing the first list of devices in the first subset of data, and storing the second list of devices in the second subset of data. In accordance with one or more aspects of the disclosure, performing the first point of compromise analysis may include determining whether a number of devices that are stored in both the first subset of data and a data module within the third set of data is above a predetermined threshold, and calculating, responsive to determining that the number of devices is above the predetermined threshold, a point of compromise score. In one aspect of the disclosure, calculating the point of compromise score may include analyzing records of each device that is stored in both the first subset of data and the data module within the third set of data.

In accordance with one or more aspects of the disclosure, performing the second point of compromise analysis may include retrieving a record for each device in the second subset of data for a first time interval, extracting locations for each purchase in each record for each device in the second subset of data for the first time interval, determining whether a number of devices from the second subset of data that had at least one purchase at a common location of the extracted locations during the first time interval is above a predetermined threshold, and generating, responsive to determining that the number of devices is above the predetermined threshold, a first list including each device from the second subset of data that had at least one purchase at the common location. In one aspect of the disclosure, a point of compromise score may be calculated responsive to determining that the number of devices is above the predetermined threshold. For example, calculating the point of compromise score may include evaluating, for each device in the first list of devices, the total number of purchases for that device for the first time interval. In another aspect of the disclosure, responsive to determining that the number of devices is not above the predetermined threshold, it may be determined whether the first time interval is equal to a maximum time interval, and responsive to determining that the first time interval is not equal to the maximum time interval, the first time interval may be increased.

In accordance with one or more embodiments, a system may include at least one processor, a communication interface, and memory storing computer-readable instructions that, when executed by the at least one processor, cause the system to receive, from a first computing device, a potential compromise event and a first set of data associated with the potential compromise event, extract, from a central server, a second set of data that is associated with the potential compromise event, compare the first set of data and the second set of data with a third set of data that is stored in a central database to generate a first subset of data and a second subset of data, perform a first point of compromise analysis on the first subset of data and the third set of data that is stored in the central database, perform a second point of compromise analysis on the second subset of data and output, to a second computing device, a first notification including a first result of the first point of compromise analysis and a second notification including a second result of the second point of compromise analysis.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
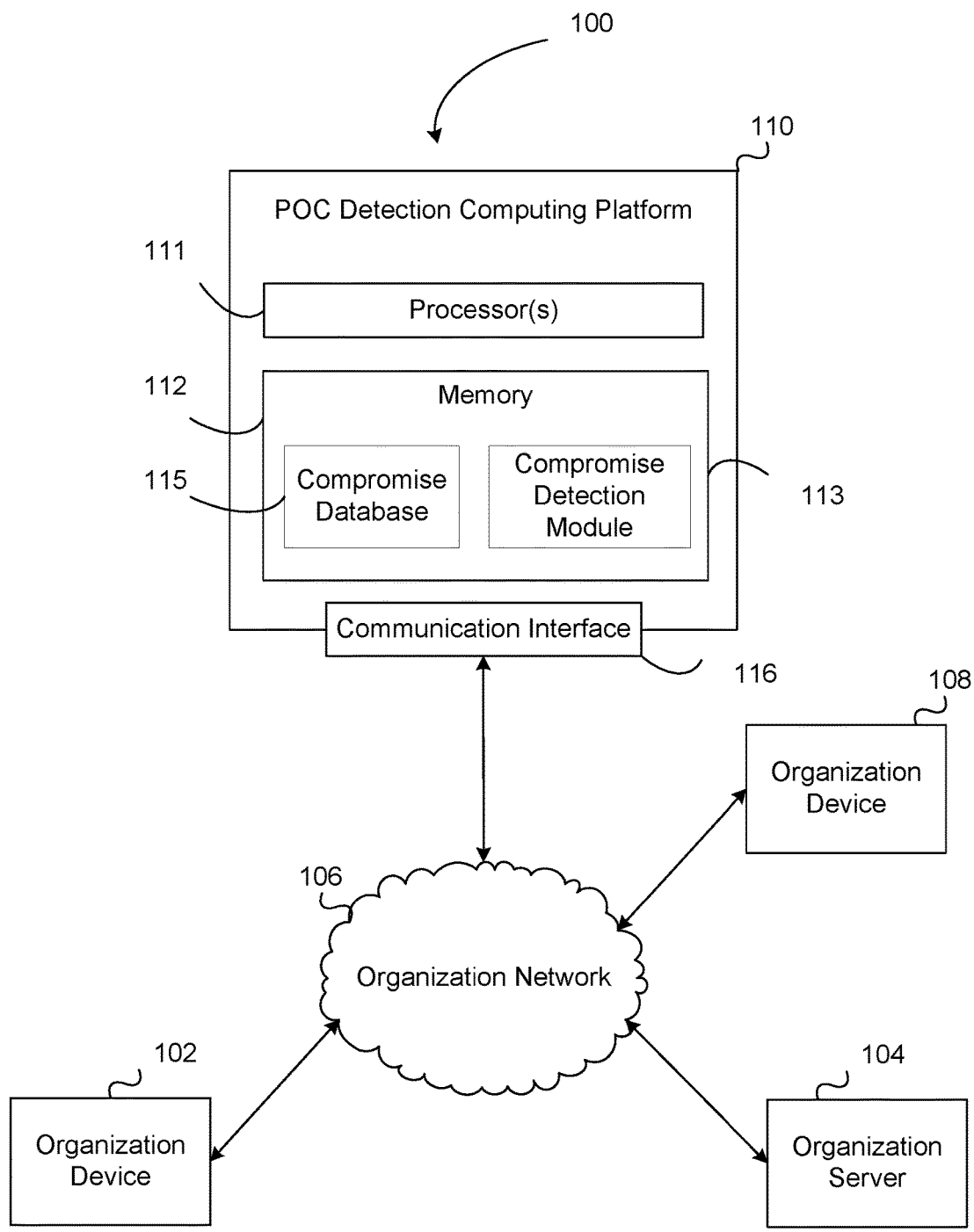
FIG. 1 depicts an illustrative computing environment for utilizing one or more databases to determine a point of compromise in accordance with one or more example embodiments.

FIG. 1 depicts an illustrative computing environment for utilizing one or more databases to determine a point of compromise in accordance with one or more example embodiments. Referring to FIG. 1, computing environment 100 may include one or more computing devices. For example, computing environment 100 may include organization device 102 and organization device 108. Organization device 102 and/or organization device 108 may be used by one or more individuals or teams associated with the enterprise organization. Organization device 102 and organization device 108 may be any type of computing device configured to provide the particular functionality described herein. For instance, organization device 102 and organization device 108 may each be a device configured to receive and/or display a user interface, receive input via the user interface, and communicate the received input to one or more other computing devices. For example, organization device 102 and organization device 108 may each be a server computer, a desktop computer, laptop computer, tablet computer, smart phone, or the like. Organization device 102 and organization device 108 may, in some instances, each be a special-purpose computing device configured to perform specific functions. Computing environment 100 may further include organization server 104. Organization server 104 may store information related to one or more points of compromise.

Computing environment 100 also may include one or more computing platforms. For example, computing environment 100 may include point of compromise (hereinafter "POC") detection computing platform 110. POC computing platform 110 may include one or more computing devices configured to perform one or more of the functions described herein. For example, POC detection computing platform 110 may include one or more computers (e.g., laptop computers, desktop computers, servers, server blades, or the like).

Computing environment 100 also may include one or more networks, which may interconnect one or more of POC detection computing platform 110, organization device 102, organization server 104, and organization device 108. For example, computing environment 100 may include organization network 106. Organization network 106 may include one or more sub-networks (e.g., LANs, WANs, or the like). Organization network 106 may be associated with a particular organization (e.g., a corporation, enterprise organization, educational institution, governmental institution, or the like) and may interconnect one or more computing devices associated with the organization. For example, POC detection computing platform 110, organization device 102, organization device 108, and organization server 104 may be associated with an organization (e.g., an enterprise organization), and organization network 106 may be associated with and/or operated by the organization, and may include one or more networks (e.g., the Internet, LANs, WANs, VPNs, or the like) that interconnect POC detection computing platform 110, organization device 102, organization server 104, and organization device 108, and one or more other computing devices and/or computer systems that are used by, operated by, and/or otherwise associated with the organization.

POC detection computing platform 110 may include one or more processors 111, memory 112, and communication interface 116. A data bus may interconnect processor(s) 111, memory 112, and communication interface 116. Communication interface 116 may be a network interface configured to support communication between POC detection computing platform 110 and organization network 106 and/or one or more sub-networks thereof. Memory 112 may include one or more modules having instructions that when executed by processor(s) 111 cause POC detection computing platform 110 to perform one or more functions described herein and/or one or more databases that may store and/or otherwise maintain information which may be used by such modules and/or processor(s) 111. For example, memory 112 may include compromise detection module 113, which may include instructions that when executed by processor(s) 111 cause POC detection computing platform 110 to perform one or more functions described herein, such as instructions for performing a first point of compromise analysis and a second point of compromise analysis, as illustrated in greater detail below. In addition, memory 112 may include a compromise database 115, which may store data related to one or more points of compromise associated with the financial institution. Compromise database 115 may be a central database that may be accessed by POC detection computing platform 110 and additional computing devices associated with the organization, such as organization device 102.

Figure 2:
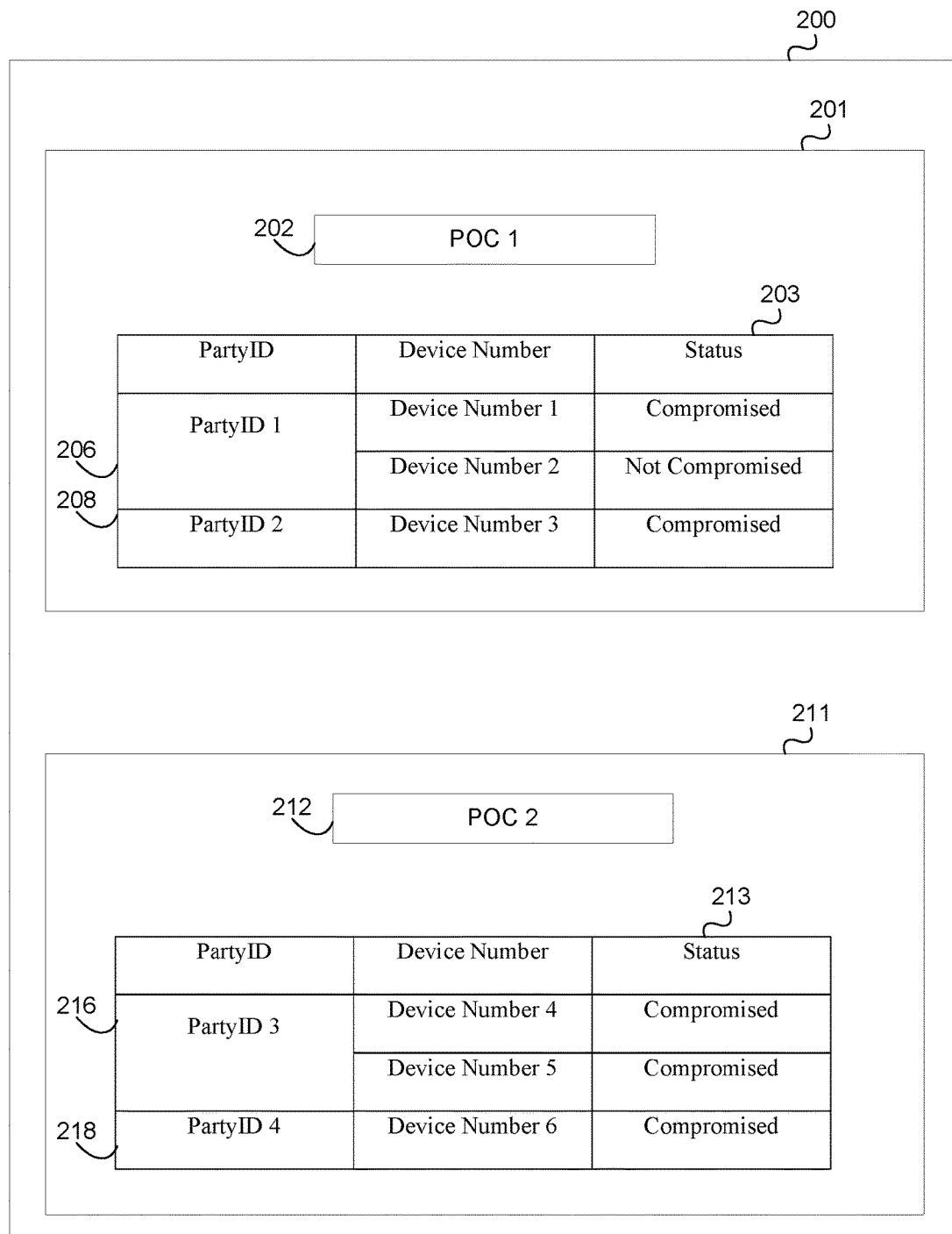
FIG. 2 depicts an illustrative point of compromise database that may be utilized by the point of compromise detection system in accordance with one or more aspects described herein.

FIG. 2 depicts an exemplary POC database 200 that may be stored in the compromise database 115 by POC detection computing platform 110. The POC database 200 may be maintained by an enterprise such as a financial institution. The enterprise may maintain financial accounts for its users, such as savings accounts and/or checking accounts. The financial institution may issue one or more devices, such as payment devices including credit and/or debit cards to a user who has an account with the financial institution. Therefore, each device issued to a user may be associated with a financial account maintained for the user by the financial institution. The user may use such a credit and/or debit card at various retailers. For example, the user may visit a brick-and-mortar store associated with a retailer, and may use a credit and/or debit card issued by the financial institution to purchase goods or services offered by the retailer. Alternatively, the user may visit a website associated with the retailer (for example, via the Internet), and may use a credit and/or debit card issued by the financial institution to purchase goods or services offered by the retailer.

In some instances, a data breach may occur and information associated with the credit and/or debit card may be stolen or compromised when the user uses the credit and/or debit card to make a purchase at a retail location (i.e. a point of compromise). For example, malware may be covertly installed on the point-of-sale system used by the retailer, and the malware may be used to capture information related to the credit and/or debit card. Information such as the card number, the expiration date, and the security code may be compromised without the user's or retailer's knowledge and/or consent.

In such an instance, information may be compromised with each purchase made at a retailer using a payment device such as a credit and/or debit card (e.g., all purchases performed at the compromised point-of-sale system may be compromised). Therefore, information associated with numerous devices (such as credit and/or debit cards) may be exposed and compromised at a single point of compromise. A first subset of the compromised credit and/or debit cards may be devices issued by the financial institution. A second subset of the compromised credit and/or debit cards may be devices issued by a second financial institution, different from the first financial institution. The compromised credit and/or debit cards in the first subset may be associated with different users of the financial institution. A user that holds a financial account at the financial institution may be associated with one or more compromised credit and/or debit cards in the first subset.

POC detection computing platform 110 may maintain a separate data module in POC database 200 for each point of compromise associated with the enterprise. A point of compromise may be associated with the financial institution if information associated with a credit and/or debit card issued by the financial institution was stolen at the point of compromise. For example, POC detection computing platform 110 may generate data module 201 and data module 203 and store data module 201 and data module 203 within POC database 200. Data module 201 may be associated with a first point of compromise associated with the financial institution. POC detection computing platform 110 may store information identifying the first point of compromise in data field 202. The identifying information may include the name of the retailer associated with the first point of compromise, the timeframe of the breach, and/or any other desired information.

POC detection computing platform 110 may further generate and store table 203 within data module 201. Table 203 may store information related to one or more devices (such as credit and/or debit cards) that were issued by the financial institution and subsequently compromised at the first point of compromise. A first column of table 203 may include information identifying a user associated with one or more credit and/or debit cards that were compromised at the first point of compromise. The user may be an individual or another organization. The information identifying the user may include at least a "PartyID," which may be a name of the user or an account number of the account held by the user. The second column of table 203 may include all devices (such as credit and/or debit cards) that were issued to the user by the financial institution. The third column of table 203 may include an indication of whether each device (such as a credit and/or debit card) listed in the second column of table 203 was compromised in the first point of compromise.

In the illustrative table 203, row 206 may be associated with a first user of the financial institution. The first column of row 206 may store a first PartyID that identifies the first user, such as the name of the first user and/or an account number of the first user's account with the financial institution. The second column of row 206 may list each credit and/or debit card that has been issued to the first user by the financial institution. Here, the first user is shown to have two devices ("Device Number 1" and "Device Number 2") that have been issued by the financial institution, but a fewer or greater number of cards may be issued by the financial institution to a single user. The third column of row 206 indicates whether each card listed in the second column of row 206 has been compromised at the first point of compromise. Here, the third column of row 206 indicates the first device listed in the second column of row 206 has been compromised and that the second device listed in the second column of row 206 has not been compromised. That is, a first device issued to the first user by the enterprise was compromised at the first point of compromise, but a second device issued to the first user by the enterprise was not compromised at the first point of compromise.

In the illustrative table 203, row 208 may be associated with a second user of the financial institution. As with the first row 206 of table 203, the first column of row 206 may store a second PartyID that identifies the second user, such as the name of the second user and/or an account number of the second user's account with the financial institution. The second column of row 208 may list each device that has been issued to the second user by the financial institution. Here, the second user is shown to have one device ("Device Number 3") that has been issued by the enterprise. The third column of row 208 indicates whether each device listed in the second column of row 208 has been compromised at the first point of compromise. Here, the third column of row 208 indicates the device listed in the second column of row 208 has been compromised.

Data module 211 may be associated with a second point of compromise associated with the financial institution. POC detection computing platform 110 may store information identifying the second point of compromise in data field 212. The identifying information may include the name of the retailer associated with the second point of compromise, the timeframe of the breach, and/or any other desired information.

POC detection computing platform 110 may further store table 213 within data module 211. Table 213 may store information related to one or more devices that were issued by the enterprise and subsequently compromised at the second point of compromise. As with table 203 in data module 201, a first column of table 213 may include information identifying a user associated with one or more devices that were compromised at the second point of compromise. The second column of table 213 may include all devices that were issued to the user by the financial institution. The third column of table 213 may include an indication of whether each device listed in the second column of table 213 was compromised in the second point of compromise.

In the illustrative table 213, row 216 may be associated with a third user of the financial institution. The third user may be the same as or different from the first user. The third user may be the same as or different from the second user. The first column of row 216 may store a third PartyID that identifies the third user, such as the name of the third user and/or an account number of the third user's account with the financial institution. The second column of row 216 may list each credit and/or debit card that has been issued to the third user by the financial institution. Here, the third user is shown to have two devices ("Device Number 4" and "Device Number 5") that have been issued by the financial institution. The third column of row 216 indicates whether each device listed in the second column of row 216 has been compromised at the second point of compromise. Here, the third column of row 216 indicates the first device listed in the second column of row 216 has been compromised and that the second device card listed in the second column of row 216 has also been compromised.

In the illustrative table 213, row 218 may be associated with a fourth user of the financial institution. The fourth user may be different than the third user. The fourth user may be the same as or different than the first user or the second user. As with the first row 216 of table 213, the first column of row 216 may store a fourth PartyID that identifies the fourth user, such as the name of the fourth user and/or an account number of the fourth user's account with the financial institution. The second column of row 218 may list each device that has been issued to the fourth user by the financial institution. Here, the fourth user is shown to have one device ("Device Number 6") that has been issued by the financial institution. The third column of row 218 indicates whether each device listed in the second column of row 218 has been compromised at the second point of compromise. Here, the third column of row 218 indicates the device listed in the second column of row 218 has been compromised.

POC database 200 is shown to have data modules 201 and 211 for a first point of compromise and a second point of compromise, respectively. However, a fewer number of data modules or a greater number of data modules may be included in POC database 200 by POC detection computing platform 110 based on the number of points of compromise that are associated with the financial institution. Tables 203 and 213 are each shown to have information related to two users of the financial institution ("PartyID 1," "PartyID 2," "PartyID 3," and "PartyID 4"). However, fewer or greater number of users may be in a table associated with a point of compromise, depending on how many users of the financial institution had a credit and/or debit card compromised at that point of compromise.

Figure 3:
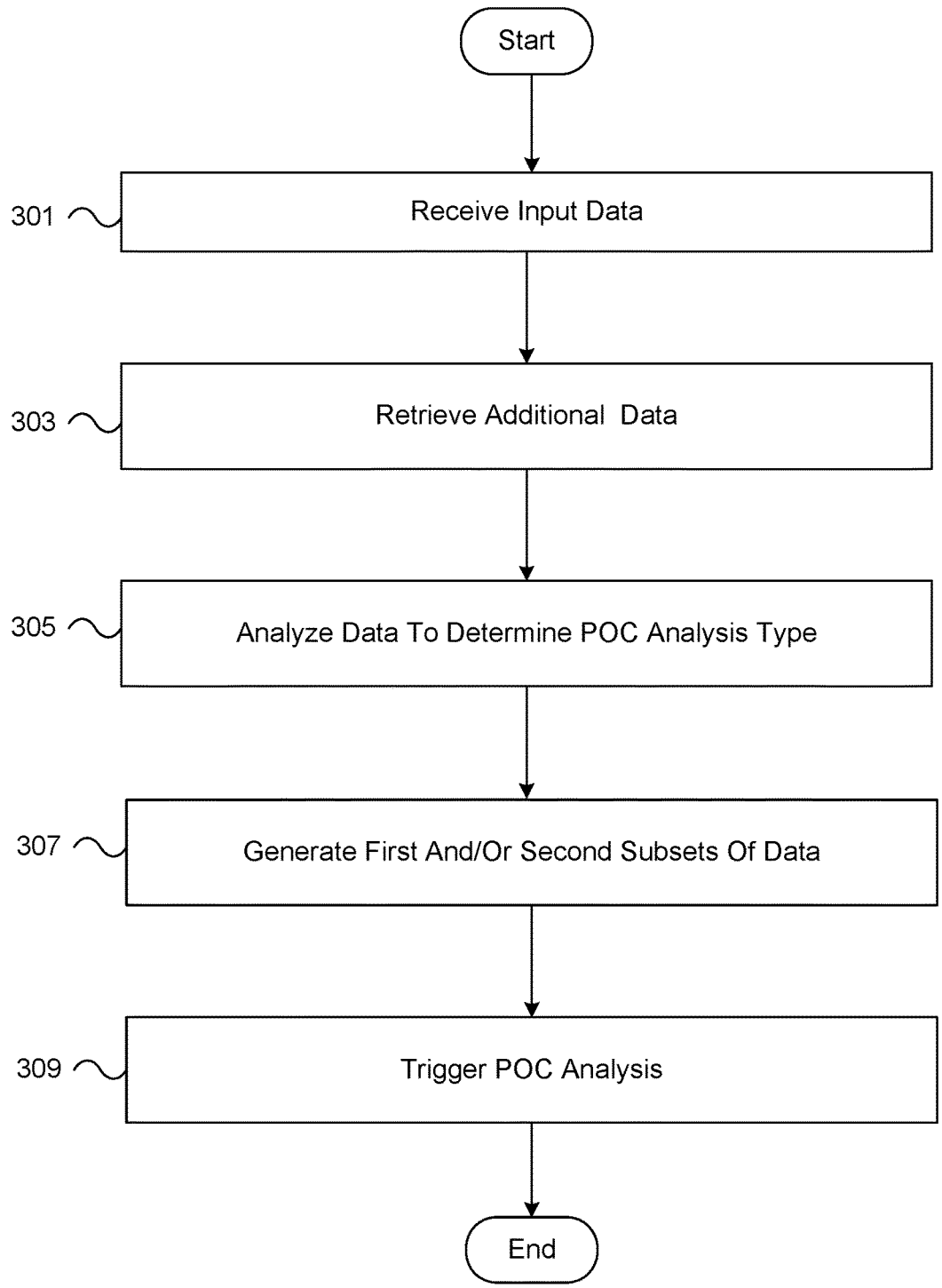
FIG. 3 depicts an illustrative method for determining the type of point of compromise analysis to be performed on compromised devices in accordance with one or more aspects described herein.

FIG. 3 depicts illustrative method for determining the type of point of compromise analysis to be performed on compromised credit and/or debit cards. At step 301, POC detection computing platform 110 may receive input data. POC detection computing platform 110 may receive the input data from a computer system associated with the financial institution. The input data may be transmitted to POC detection computing platform 110 as a result of being potentially indicative of a point of compromise. The input data may be potentially indicative of a point of compromise if the input data is associated with a potential compromise event.

An enterprise organization may issue one or more devices, such as payment devices including credit and/or debit cards, to a user who has an account with the enterprise organization. As noted above, a party may compromise or obtain without authorization information associated with numerous credit and/or debit cards at a single point of compromise. In order to utilize the compromised information, the party must individually authenticate each compromised credit and/or debit card. The party may authenticate a compromised credit and/or debit card issued by a financial institution using a variety of different channels, such as an in-person banking channel (which may, e.g., be associated with one or more banking centers and/or other physical retail locations operated by the financial institution), a telephone banking channel (which may, e.g., be associated with one or more telephone lines serviced by one or more user service representatives and/or call centers of the financial institution), an online banking channel (which may, e.g., be associated with one or more online banking portals and/or mobile banking applications provided by the financial institution), an automated teller device channel (which may, e.g., be associated with one or more automated teller machines (ATMs), automated teller assistants (ATAs), and/or other automated teller devices operated by the financial institution), and/or one or more other channels. In order to authenticate a credit and/or debit card, a financial institution may require, in addition to information associated with the credit and/or debit card (such as the card number, the expiration date of the card, and/or the security code), information such as a username, a password, a one-time passcode, one or more responses to one or more challenge questions, biometric input, and/or the like.

In the case of the party attempting to authenticate the compromised credit and/or debit cards via a telephone banking channel, the party may only generally authenticate a single compromised credit and/or debit card during a single phone call. Therefore, if multiple credit and/or debit cards issued by a financial institution were illicitly obtained by a party at a single point of compromise, the party must contact the financial institution via the telephone banking channel multiple times (i.e. once for each compromised credit and/or debit card issued by the financial institution). The financial institution may track or record all authentication requests processed via its telephone banking channels. For example, the financial institution may record the actual authentication-related telephone call, and may further track the originating telephone number (i.e. the telephone number from which a party attempts to authenticate a credit and/or debit card issued by the financial institution), the card number of the credit and/or debit card that the party is attempting to authenticate, whether the authentication failed or succeeded, and/or any other desired information.

The financial institution may then analyze the tracked data to detect a potential compromise event. In a first example, if the number of failed authentication requests for a first credit and/or debit card issued by the financial institution is greater than a first threshold, the financial institution may determine that the first credit and/or debit card is associated with a first potential compromise event. In a second example, if the number of authentication requests made from an originating telephone number is greater than a second threshold, the financial institution may determine that that originating telephone number is associated with a second potential compromise event. In a third example, if the number of failed authentication requests made from an originating telephone number is greater than a third threshold, the financial institution may determine that the originating telephone number is associated with a third potential compromise event.

Once a potential compromise event has been detected, the potential compromise event and data associated with the potential compromise event may be transmitted to POC detection computing platform 110. The data associated with the potential compromise event may include an originating phone number and/or information identifying one or more devices, such as one or more credit and/or debit cards issued by the financial institution or enterprise organization. Continuing with the first example, the POC detection computing platform 110 may receive input data that includes the first potential compromise event, the card number of the first credit and/or debit card, and other data associated with the first credit and/or debit card (for example, information identifying the user to which the first credit and/or debit card has been issued). Continuing with the second example above, the POC detection computing platform 110 may receive input data including the second potential compromise event, the originating telephone number, information identifying each of the devices that the originating telephone number attempted to authenticate (including, but not limited to, card numbers of the credit and/or debit cards that the originating telephone number attempted to authenticate), and other data associated with each of the credit and/or debit cards that the originating telephone number attempted to authenticate (for example, information identifying the user to which each of the credit and/or debit cards have been issued). Continuing with the third example above, the POC detection computing platform 110 may receive input data including the third potential compromise event, the originating telephone number, information identifying each of the payment devices that the originating telephone number unsuccessfully attempted to authenticate (such as, but not limited to, card numbers of the credit and/or debit cards that the originating telephone number unsuccessfully attempted to authenticate), and other data associated with each of the credit and/or debit cards that the originating telephone number unsuccessfully attempted to authenticate (for example, information identifying the user to which each of the credit and/or debit cards have been issued).

At step 303, POC detection computing platform 110 may retrieve additional data that may be associated with or relevant to the potential compromise event. POC detection computing platform 110 may extract the additional data from one or more servers and/or databases maintained by the financial institution, such as organization server 104 and/or compromise database 115. If the input data received by POC detection computing platform 110 at step 301 includes an originating telephone number and a series of devices (such as credit and/or debit cards) that the originating number attempted to authenticate (either successfully or unsuccessfully), POC detection computing platform 110 may determine if the originating telephone number was used to contact any users of the financial institution. If the originating telephone number was used to contact one or more users of the financial institution, POC detection computing platform 110 may retrieve information associated with each of the one or more users contacted by the originating telephone number. Such information may include, but is not limited to, all accounts maintained by the financial institution for the user, and information related to all devices (such as credit and/or debit cards) issued to the user by the financial institution (such as the card number, expiration date, and security code). If the input data received by the POC detection computing platform 110 at step 301 includes information identifying one or more users to which a compromised device has been issued, POC detection computing platform 110 may retrieve information associated with each of the one or more users. Such information may include, but is not limited to, all accounts maintained by the financial institution for each of the one or more users, and information related to all of the credit and/or debit cards issued to each of the one or more users by the financial institution (such as the card number, expiration date, and security code). If the input data received by the POC detection computing platform 110 at step 301 includes information indicating that an originating telephone number unsuccessfully attempted to authenticate one or more devices issued by the financial institution, POC detection computing platform 110 may determine whether any unsuccessful attempts to authenticate any of the one or more credit and/or debit cards was previously made by a different originating telephone number. If so, POC detection computing platform 110 may then retrieve a list of all credit and/or debit cards that were the subject of authentication requests made from the different originating telephone number.

At step 305, POC detection computing platform 110 may analyze the input data received at step 301 and the additional data retrieved at step 303 to determine the type of point of compromise analysis to be performed on the data. As discussed above in reference to step 301, the input data received at step 301 may include one or more compromised devices issued by the financial institution, such as one or more devices, such as credit and/or debit cards, issued by the financial institution. As discussed above in reference to step 303, POC detection computing platform 110 may retrieve all devices (such as credit and/or debit cards) issued by the financial institution to users who have been contacted by an originating phone number that is associated with a potential compromise event and all credit and/or debit cards issued by the financial institution to users who have at least one compromised credit and/or debit card that has been issued by the financial institution. As further discussed above in reference to step 303, for one or more devices that were subjects of unsuccessful authorization requests by an originating telephone number, POC detection computing platform 110 may first determine whether a different originating telephone number made authentication requests for the one or more credit and/or debit cards and if so, POC detection computing platform 110 may retrieve a list of all credit and/or debit cards that were the subject of authentication requests made from the different originating telephone number.

POC detection computing platform 110 may analyze the data by determining if one or more of these credit and/or debit cards is already stored in POC database 200. As discussed above in reference to FIG. 2, POC detection computing platform 110 may maintain a separate data module in POC database 200 for each point of compromise associated with the financial institution. As further discussed above in reference to FIG. 2, each data module in POC database 200 may include a table listing each device (such as each credit and/or debit card) that was compromised at the point of compromise associated with that data module, the user to which each compromised credit and/or debit card was issued, and any additional credit and/or debit cards issued to those users by the financial institution.

POC detection computing platform 110 may compare each device received at step 301 or retrieved at step 303 with the devices listed in the table of each data module in POC database 200. Based on the results of the comparison, POC detection computing platform 110 may generate a first list of devices and a second list of devices. The devices in each of the first list and the second list may be credit and/or debit cards. The first list of devices may include each credit and/or debit card received at step 301 or retrieved at step 303 that is already stored in POC database 200. The second list of devices may include each credit and/or debit card received at step 301 or retrieved at step 303 that is not stored in POC database 200.

Based on the results of the comparison, POC detection computing platform 110 may generate, at step 307, a first subset of data and/or a second subset of data. The first subset of data may include the first list of devices. The devices in the first list of devices may be credit and/or debit cards. The first subset of data may further indicate, for each credit and/or debit card stored therein, information identifying the data module of POC database 200 in which that credit and/or debit card is stored. If a credit and/or debit card is stored in multiple data modules of POC database 200, each data module may be listed in the first subset of data. The first subset of data may additionally include information related to each credit and/or debit card stored therein, such as the user to which the credit and/or debit card is issued. The second subset of data may include the second list of devices. The devices in the second list of devices may be credit and/or debit cards. The second subset of data may additionally include information related to each credit and/or debit card stored therein, such as the user to which the credit and/or debit card is issued. POC detection computing platform 110 may then, at step 309, trigger a first point of compromise analysis for the first subset of data and/or a second point of compromise analysis for the second subset of data. If both a first point of compromise analysis and a second point of compromise analysis are triggered, POC detection computing platform 110 may perform the first point of compromise analysis and the second point of compromise analysis in parallel or sequentially.

Figure 4:
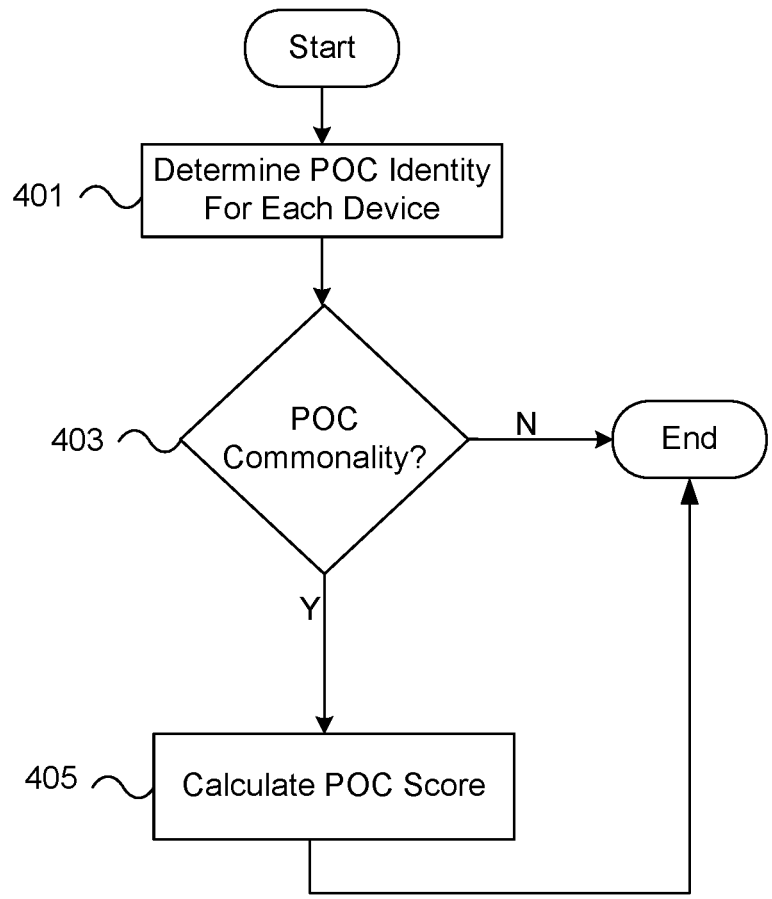
FIG. 4 depicts an illustrative method for performing a first point of compromise analysis in accordance with one or more aspects described herein.

FIG. 4 depicts an illustrative method for performing a first point of compromise analysis. POC detection computing platform 110 may perform the first point of compromise analysis on a first subset of data. The first subset of data may include a list of each device received at step 301 (discussed above in reference to FIG. 3) or retrieved at step 303 (discussed above in reference to FIG. 3) that is already stored in POC database 200. These devices may be credit and/or debit cards. The first subset of data may additionally include information related to each credit and/or debit card stored therein, such as the user to which the credit and/or debit card is issued. The first subset of data may further indicate, for each credit and/or debit card stored therein, information identifying the data module of POC database 200 in which that credit and/or debit card is stored. As discussed above with reference to FIG. 2, each data module within POC database 200 is associated with a different point of compromise.

At step 401, POC detection computing platform 110 may extract, from the first subset of data, the identity of the data module(s) storing each device in the first subset of data. For example, a first credit card stored in the first subset of data and a first debit card stored in the first subset of data may already be stored in table 203 of data module 201 of POC database 200, and a second credit card stored in the first subset of data and a second debit card stored in the first subset of data may further be stored in table 213 of data module 211 of POC database 200. Data module 201 may be associated with a first point of compromise and data module 211 may be associated with a second point of compromise.

At step 403, POC detection computing platform 110 may determine if there is a commonality between the devices listed in the first subset of data. POC detection computing platform 110 may determine if there is a commonality between the each of the credit and/or debit cards listed in the first subset of data by comparing the identities of the data modules that were extracted at step 401. There may be a commonality between the credit and/or debit cards listed in the first subset of data if the number of identical data modules is above a predetermined threshold. Alternatively, there may be a commonality between the credit and/or debit cards listed in the first subset of data if the percentage of credit and/or debit cards that are stored in both the first subset of data and the same data module is above a predetermined threshold. If, at step 403, POC detection computing platform 110 determines that there is no commonality between the devices listed in the first subset of data, the first point of compromise analysis may end. Alternatively, prior to ending the first point of compromise analysis, POC detection computing platform 110 may send output indicating the results of the first point of compromise analysis to a computing system associated with the financial institution. For example, POC detection computing platform 110 may transmit a notification to organization device 108 indicating that the first point of compromise analysis has not detected a commonality.

If, at step 403, POC detection computing platform 110 determines that there is a commonality between the devices listed in the first subset of data (i.e. the credit and/or debit cards listed in the first subset of data are associated with a common data module from POC database 200), POC detection computing platform 110 may, at step 405, calculate a point of compromise score ("POC score") for the first subset of data. As discussed above in reference to FIG. 2, each data module in the POC database 200 is associated with a point of compromise. The POC score may represent a likelihood that the first subset of data is connected to the point of compromise that is associated with the data module that is common to the credit and/or debit cards listed in the first subset of data.

The POC score may be based on one or more factors. For example, the POC score may further be based on the total number of purchases that were made on each of the devices that are listed in the first subset of data and are associated with a common data module from POC database 200. Generally, if a credit card had a purchase at the common location during a billing cycle and only had an additional five purchases during that billing cycle, the confidence that the common location represents a point of compromise is higher than if that card had an additional 500 purchases during that same billing cycle. The location may represent the point of sale location for a transaction or purchase.

The POC score may be based on the total volume of the devices that are associated with the data module that is common to the credit and/or debit cards listed in the first subset of data (hereinafter "the common data module"). In a first example, the first subset of data may contain a list of 200 credit and/or debit cards, and 100 of these credit and/or debit cards may be stored in data module 201 of POC database 200. In a second example, the first subset of data may contain a list of 100 credit and/or debit cards, and 50 of these credit and/or debit cards may be stored in data module 201 of POC database 200. The POC score would be higher in the first example, because even though the percentage of credit and/or debit cards found in both the first subset of data and data module 201 (the common data module in this example) is the same in both examples, the total volume of credit and/or debit cards found in both the first subset of data and the common data module is higher in the first example than in the second example.

The POC score may further be based on an analysis of the record of each device that is in the first subset of data and is further stored in the common data module of POC database 200. The record of each device may include a list of all purchases or transactions made on the device. Generally, if a credit and/or debit card has a transaction at the common location during a billing cycle and additional transactions at only a few other locations during that same billing cycle, there is a greater confidence that the common location may be a point of compromise than if the same credit and/or debit card has a transaction at the common location during a billing cycle and additional transactions at a high number of other locations during that same billing cycle. For example, the first subset of data may include 100 credit and/or debit cards that are further stored in the common data module of POC database 200. That is, the first subset of data may include 100 credit and/or debit cards that had at least one transaction at the point of compromise during a billing cycle. In a first instance, of these 100 credit and/or debit cards, the number of credit and/or debit cards that had transactions at less than a first number of locations during that same billing cycle may be 50 (i.e. 50% of the credit and/or debit cards in the first subset of data had at least one transaction at the point of compromise during a billing cycle and had transactions at less than a first number of locations during that same billing cycle). In a second instance, of these 100 credit and/or debit cards, the number of credit and/or debit cards that had transactions at less than a first number of locations during that same billing cycle may be 25 (i.e. 25% of the credit and/or debit cards in the first subset of data had at least one transaction at the point of compromise during a billing cycle and had transactions at less than a first number of locations during that same billing cycle). The POC score would be higher in the second instance, because there is a greater confidence in the second instance that the common location represents a point of compromise than in the first instance. The first point of compromise analysis may end after the POC score is computed. Alternatively, prior to ending the first point of compromise analysis, POC detection computing platform 110 may send an output indicating the results of the first point of compromise analysis to a computing system associated with the financial institution. For example, POC detection computing platform 110 may transmit a notification to organization device 108 indicating that the first point of compromise analysis has detected a commonality. The notification may include the identity of the common data module determined in step 403 and the POC score calculated in step 405.

Figure 5:
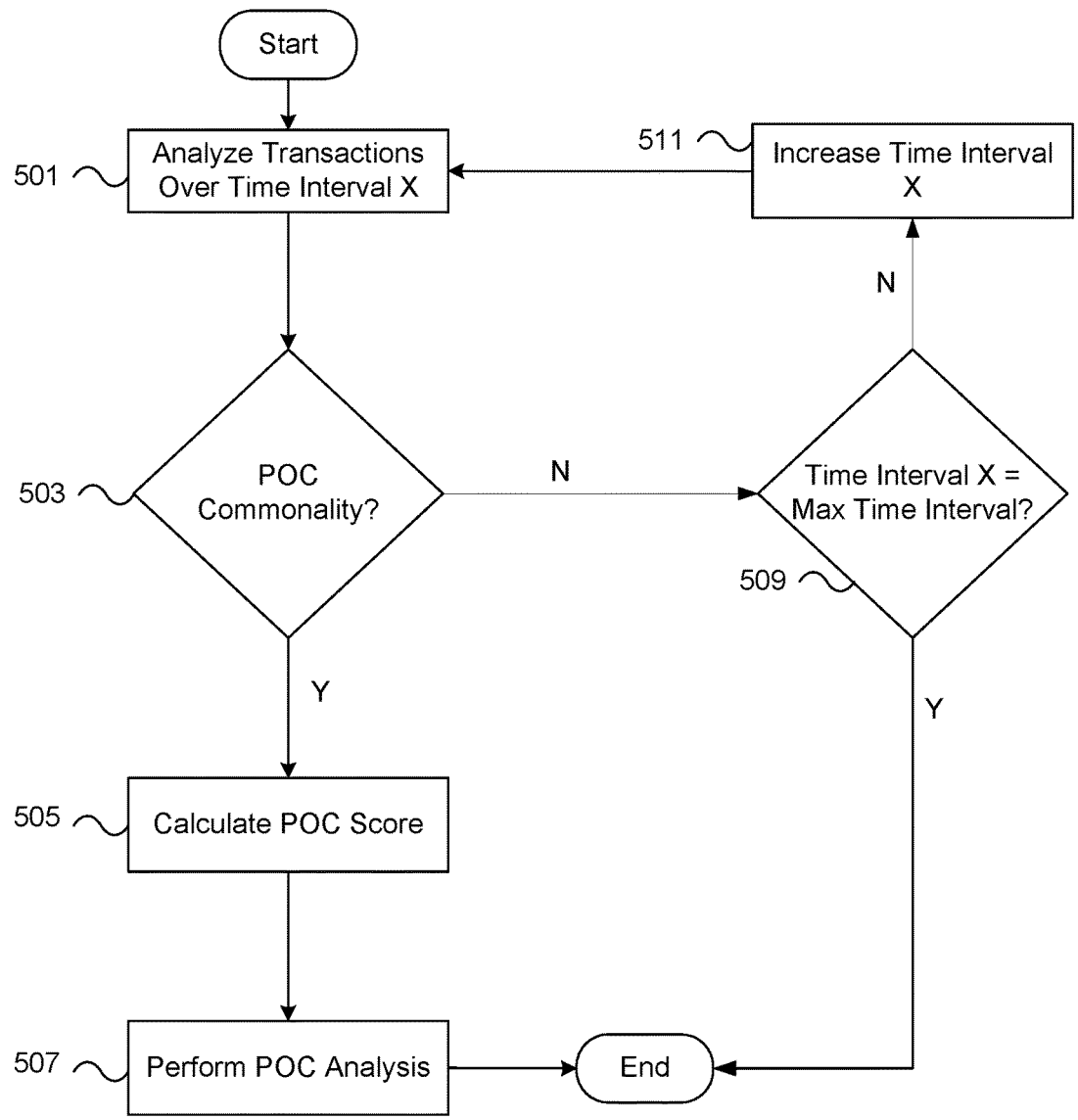
FIG. 5 depicts an illustrative method for performing a second point of compromise analysis in accordance with one or more aspects described herein.

FIG. 5 is an illustrative method for performing a second point of compromise analysis. POC detection computing platform 110 may perform the second point of compromise analysis on a second subset of data. The second subset of data may include a list of each device received at step 301 (discussed above in reference to FIG. 3) or retrieved at step 303 (discussed above in reference to FIG. 3) that is not stored in POC database 200. These devices may be credit and/or debit cards. The second subset of data may additionally include information related to each device stored therein, such as the user to which the credit and/or debit card is issued.

At step 501, POC detection computing platform 110 may analyze the record for each device (such as a credit and/or debit card) stored in the second subset of data. The record for each device may include a list of all purchases or transactions made on the device. That is, the record may be a transaction history of the device. POC detection computing platform 110 may analyze the record for each credit and/or debit card stored in the second subset of data for a first time interval X. Time interval X may represent a predetermined number of days, weeks, months, or years. Time interval X may be dynamically customizable by POC detection computing platform 110. POC detection computing platform 110 may retrieve the transaction history for each credit and/or debit card stored in the second subset of data from a server or database maintained by the financial institution, such as organization server 104 and/or compromise database 115.

In a first instance, POC detection computing platform 110 may retrieve the entire record for each device stored in the second subset of data. In a second instance, POC detection computing platform 110 may retrieve the record for each credit and/or debit card stored in the second subset of data for only the time interval of X. POC detection computing platform 110 may locally cache the retrieved transaction history for each credit and/or debit card stored in the second subset of data in memory 112 of POC detection computing platform 110.

POC detection computing platform 110 may analyze the record for each device stored in the second subset of data for time interval X by extracting the location for each transaction and/or purchase on each credit and/or debit card stored in the second subset of data for time interval X. The extracted location may present the point of sale location for each transaction on each credit and/or debit card stored in the second subset of data for time interval X. POC detection computing platform 110 may then aggregate these locations in a local table within memory 112 of POC detection computing platform 110. POC detection computing platform 110 may then compute, for each location stored in the local table, how many unique credit and/or debit cards stored in the second subset of data transacted at that location during time interval X. POC detection computing platform 110 may store this computed information within the local table.

At step 503, POC detection computing platform 110 may analyze the computed information to determine if there is a commonality within the analyzed record of each device stored in the second subset of data. There may be a commonality between the credit and/or debit cards listed in the second subset of data if the number of unique credit and/or debit cards that transacted at a common location during time interval X is above a predetermined threshold. The predetermined threshold may have been previously configured within POC detection computing platform 110 or may be dynamically determined by POC detection computing platform 110. Alternatively, there may be a commonality within the analyzed record of the credit and/or debit cards listed in the second subset of data if the percentage of unique credit and/or debit cards that transacted at a common location during time interval X is above a predetermined threshold. The predetermined threshold may have been previously configured within POC detection computing platform 110 or may be dynamically determined by POC detection computing platform 110.

If, at step 503, POC detection computing platform 110 determines that there is no commonality within the analyzed record of each device stored in the second subset of data during time interval X, POC detection computing platform 110 may, at step 509, determine if the value of time interval X is equal to a maximum time interval. The maximum time interval may have been previously configured within POC detection computing platform 110. If, at step 509, POC detection computing platform 110 determines that the value of time interval X is equal to a maximum time interval, the second point of compromise analysis may end. Alternatively, prior to the second point of compromise analysis ending, POC detection computing platform 110 may send the results to a computing system associated with the financial institution. For example, POC detection computing platform 110 may send a notification to organization 108 indicating that the second point of compromise analysis was unable to find a point of compromise commonality.

If, at step 509, POC detection computing platform 110 determines that the value of time interval X is not equal to a maximum time interval, POC detection computing platform 110 may, at step 511, increase the value of time interval X. That is, POC detection computing platform 110 may increase the number of days, weeks, months, or years of transaction history that is to be analyzed for each credit and/or debit card stored in the second subset of data. The amount by which time interval X is to be increased may be dynamically determined by POC detection computing platform 110 or may have been preset within POC detection computing platform 110. Processing may then return to step 501, where the record for each credit and/or debit card listed in the second subset of data is analyzed for the new time interval X.

If, at step 503, POC detection computing platform 110 determines that there is a commonality within the analyzed record of each of the devices listed in the second subset of data, POC detection computing platform 110 may generate a POC commonality list. The POC commonality list may be a list of credit and/or debit cards that are stored in the second subset of data and that additionally had a transaction at the common location identified in step 503. POC detection computing platform 110 may, at step 505, compute a POC score. The POC score may represent a likelihood that the common location identified in step 503 represent a point of compromise associated with the financial institution.

As with step 405 (discussed above in reference to FIG. 4), the POC score calculated at step 505 may be based on one or more factors. The POC score may be based on the total volume of the devices stored in the second subset of data that had one or more transactions and/or purchases at the common location. In a first example, the second subset of data may contain a list of 200 credit and/or debit cards, and a first POC commonality list generated at step 503 may include 100 credit and/or debit cards (i.e. of the 200 credit and/or debit cards stored in the second subset of data, 100 of these may have had one or more transactions at the common location). In a second example, the second subset of data may contain a list of 100 credit and/or debit cards, and a second POC commonality list generated at step 503 may include 50 credit and/or debit cards (i.e. of the 100 credit and/or debit cards stored in the second subset of data, 50 of these may have had one or more transactions at the common location). The POC score would be higher in the first example, because even though the percentage of credit and/or debit cards that had one or more transactions at the common location is the same in both examples, the total volume of credit and/or debit cards that had one or more transactions at the common location is higher in the first example than in the second example (that is, the volume of credit and/or debit cards in the first POC commonality list is greater than the volume of credit and/or debit cards in the second POC commonality list). The POC score may further be based on the total number of transactions that were made on each of the credit and/or debit cards stored in the second subset of data that had one or more transactions at the common location. Generally, if a card in the POC commonality list generated at step 503 only had a total of 5 transactions during time interval X, the confidence that the common location represents a point of compromise is higher than if that card had a total of 500 transactions during time interval X.

The POC score may further be based on an additional analysis of the record for each device listed in the POC commonality list for time interval X. Generally, if a credit and/or debit card has a transaction at the common location and additional transactions at only a few other locations during time interval X, there is a greater confidence that the common location may be a point of compromise than if the same credit and/or debit card had a transaction at the common location and additional transactions at a high number of other locations during time interval X. For example, the second subset of data may include 200 credit and/or debit cards, and the POC commonality list may include 100 of these 200 credit and/or debit cards (that is, 100 of these 200 credit and/or debit cards may have had one or more transactions at the common location during time interval X). In a first instance, of 100 credit and/or debit cards in the POC commonality list, the number of credit and/or debit cards that had transactions at less than a first number of locations during that same time interval X may be 50 (i.e. 50% of the credit and/or debit cards in the second subset of data that had one or more transactions at the common location during time interval X also had transactions at less than a first number of locations during that same time interval X). In a second instance, of the 100 credit and/or debit cards in the POC commonality list, the number of credit and/or debit cards that had transactions at less than a first number of locations during that same time interval X may be 25 (i.e. 25% of the credit and/or debit cards in the second subset of data that had one or more transactions at the common location during time interval X also had transactions at less than a first number of locations during that same time interval X). Therefore, in the example above, the POC score would be higher in the second instance than in the first instance because there is a greater confidence in the second instance that the common location represents a point of compromise than in the first instance.

After the POC score has been calculated at step 505, POC detection computing platform 110 may perform POC analysis at step 507. For example, POC detection computing platform 110 may have determined that the common location represents a point of compromise that is associated with the financial institution. POC detection computing platform 110 may then create data module 201 in POC database 200 for the newly detected point of compromise associated with the financial institution. POC detection computing platform 110 may store information identifying the newly detected point of compromise in data field 202. The identifying information may include the name of the retailer associated with the first point of compromise, the timeframe of the breach, and/or any other desired information. POC detection computing platform 110 may further store table 203 within data module 201. In table 203, POC detection computing platform 110 may store information related to each of the devices (such as credit and/or debit cards) listed in the second subset of data, or related to each of the credit and/or debit cards listed in the second subset of data that had at least one transaction at the newly detected point of compromise. The second point of compromise analysis may end once the POC analysis has been calculated. Alternatively, prior to ending the second point of compromise analysis, POC detection computing platform 110 may send the results of the second point of compromise analysis to a computing system associated with the financial institution. For example, POC detection computing platform 110 may send a notification to organization device 108 identifying the common location determined in step 503, the POC score calculated in step 505, and the results of the POC analysis performed in step 507.

Additionally, POC detection computing platform 110 may determine which credit and/or debit cards of the credit and/or debit cards stored in the second subset of data to reissue. POC detection computing platform 110 may make such a determination by evaluating the number of credit and/or debit cards listed in the second subset of data and/or the number of credit and/or debit cards listed in the second subset of data that had at least one transaction at the newly detected point of compromise. In one instance, POC detection computing platform 110 may determine that all credit and/or debit cards listed in the second subset of data should be reissued by the financial institution. In a second instance, POC detection computing platform 110 may determine that only the credit and/or debit cards listed in the second subset of data that had at least one transaction at the newly detected point of compromise should be reissued. POC detection computing platform 110 may transmit this information to one or more organization devices, such as organization device 102.

Additionally, POC detection computing platform 110 may send a notification to one or more computing devices associated with the financial institution, such as organization device 102. The notification may include information on the newly detected point of compromise. The information may include the number of credit and/or debit cards that are associated with the financial institution and that were compromised at the newly detected point of compromise. The financial institution may then contact other enterprise organizations to determine if credit and/or debit cards issued by those enterprise organizations were compromised at the newly detected point of compromise.

Figure 6:
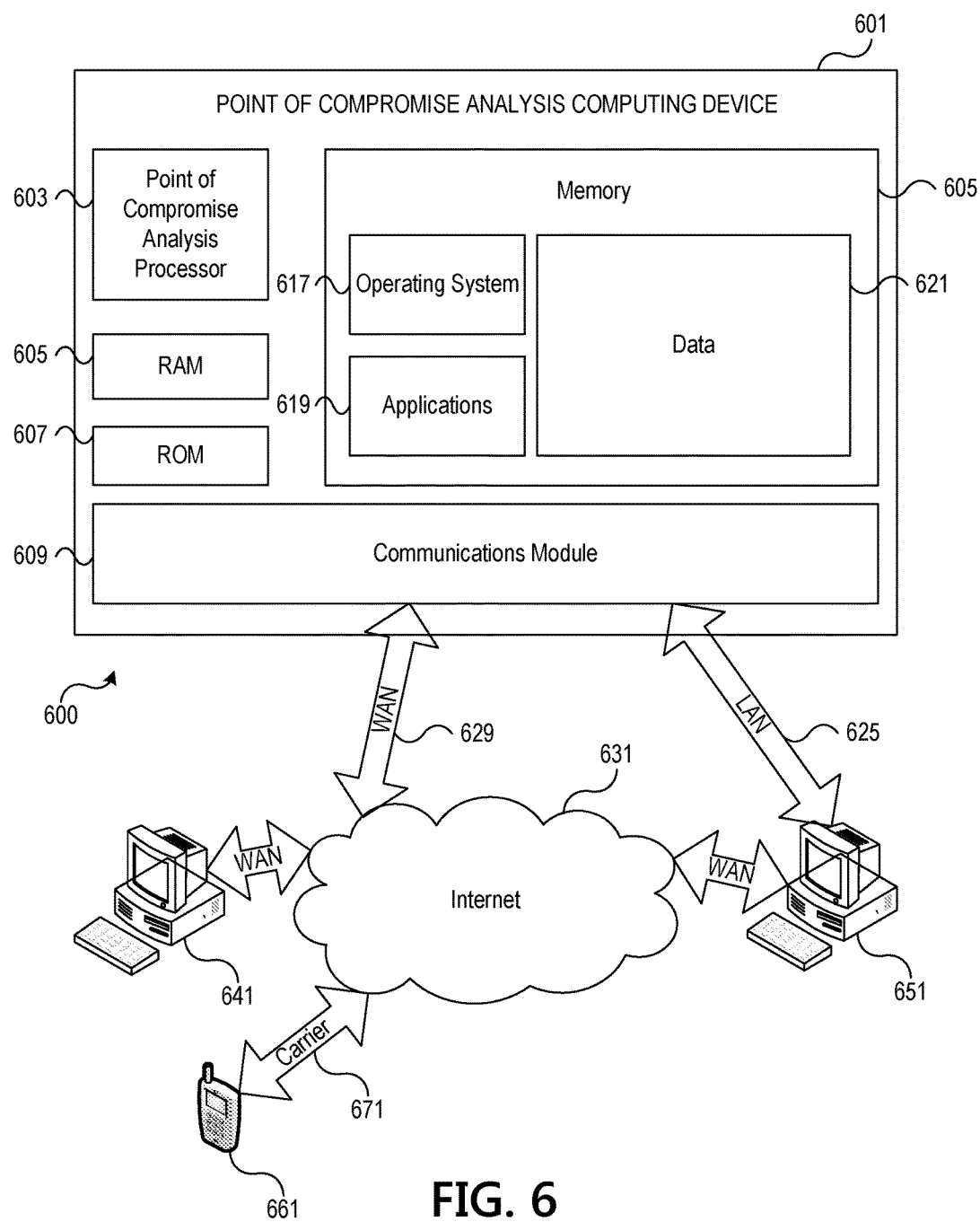
FIG. 6 depicts an illustrative operating environment in which various aspects of the disclosure may be implemented in accordance with one or more example embodiments.

FIG. 6 depicts an illustrative POC detection environment in which various aspects of the present disclosure may be implemented in accordance with one or more example embodiments. Referring to FIG. 6, computing system environment 600 may be used according to one or more illustrative embodiments. Computing system environment 600 is one example of a suitable computing environment. Computing system environment 600 should not be interpreted as having any dependency or requirement relating to any one or combination of components shown in illustrative computing system environment 600.

Computing system environment 600 may include point of compromise analysis computing device 601 having point of compromise analysis processor 603 for controlling overall operation of point of compromise analysis computing device 601 and its associated components, including random-access memory (RAM) 605, read-only memory (ROM) 607, communications module 609, and memory 615. Point of compromise analysis computing device 601 may include a variety of computer readable media. Computer readable media may be any available media that may be accessed by point of compromise analysis computing device 601, may be non-transitory, and may include volatile and nonvolatile, removable and non-removable media implemented in any method or technology for storage of information such as computer-readable instructions, object code, data structures, modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by point of compromise analysis computing device 601.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on point of compromise analysis computing device 601. Such a processor may execute computer-executable instructions stored on a computer-readable medium.

Software may be stored within memory 615 and/or storage to provide instructions to point of compromise analysis processor 603 for enabling point of compromise analysis computing device 601 to perform various functions. For example, memory 615 may store software used by point of compromise analysis computing device 601, such as operating system 617, application programs 619, and associated database 621. Also, some or all of the computer executable instructions for point of compromise analysis computing device 601 may be embodied in hardware or firmware. Although not shown, RAM 605 may include one or more applications representing the application data stored in RAM 605 while point of compromise analysis computing device 601 is on and corresponding software applications (e.g., software operations) are running on point of compromise analysis computing device 601.

Communications module 609 may include a microphone, keypad, touch screen, and/or stylus through which a user of the POC detection environment may provide input, and may also include one or more of a speaker for providing audio output and a video display device for providing textual, audiovisual and/or graphical output. Point of compromise analysis computing device 601 may also include optical scanners (not shown). Exemplary usages include scanning and converting paper documents, e.g., correspondence, receipts, and the like, to digital files.

Point of compromise analysis computing device 601 may operate in a networked environment supporting connections to one or more remote computing devices, such as computing devices 641, 651, and 661. Computing devices 641, 651, and 661 may be personal computing devices or servers that include any or all of the elements described above relative to point of compromise analysis computing device 601. Computing device 661 may be a mobile device (e.g., smart phone) communicating over wireless carrier channel 671.

The network connections depicted in FIG. 6 may include local area network (LAN) 625 and wide area network (WAN) 629, as well as other networks. When used in a LAN networking environment, point of compromise analysis computing device 601 may be connected to LAN 625 through a network interface or adapter in communications module 609. When used in a WAN networking environment, point of compromise analysis computing device 601 may include a modem in communications module 609 or other means for establishing communications over WAN 629, such as Internet 631 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other special purpose computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 7:
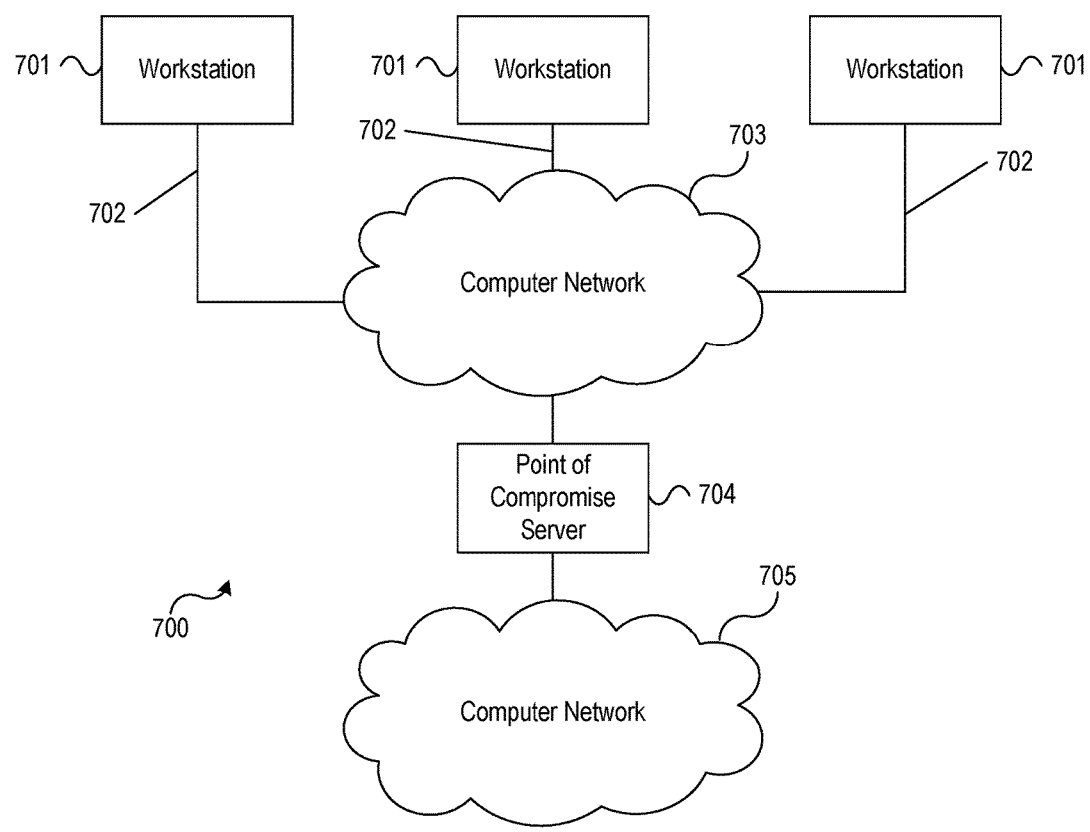
FIG. 7 depicts an illustrative block diagram of workstations and servers that may be used to implement the processes and functions of certain aspects of the present disclosure in accordance with one or more example embodiments.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like. Workstations 701 may be local or remote, and may be connected by one of communications links 702 to computer network 703 that is linked via communications link 705 to point of compromise server 704. In system 700, point of compromise server 704 may be any suitable server, processor, computer, or data processing device, or combination of the same. Point of compromise server 704 may be used to process the instructions received from, and the transactions entered into by, one or more participants.

Computer network 703 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 702 and 705 may be any communications links suitable for communicating between workstations 701 and point of compromise server 704, such as network links, dial-up links, wireless links, hard-wired links, as well as network types developed in the future, and the like.

One or more aspects of the disclosure may be embodied in computer-usable data or computer-executable instructions, such as in one or more modules, executed by one or more computers or other devices to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface; and
   memory storing computer-readable instructions that, when executed by the at least one processor, cause the system to:
   receive, from a first computing device and via the communication interface, a potential compromise event and a first set of data associated with the potential compromise event;
   extract, from a central server and via the communication interface, a second set of data that is associated with the potential compromise event;
   compare the first set of data and the second set of data with a third set of data that is stored in a central database to generate a first subset of data and a second subset of data by:
     determining a first list of devices, wherein each device in the first list of devices is stored in the third set of data and at least one of the first set of data and the second set of data;
     determining a second list of devices, wherein each device in the second list of devices is stored in at least one of the first set of data and the second set of data, but is not stored in the third set of data;
     storing the first list of devices in the first subset of data; and
     storing the second list of devices in the second subset of data; and
   responsive to generating the first subset of data, trigger a first point of compromise analysis on the first subset of data and the third set of data that is stored in the central database;
   responsive to generating the second subset of data, trigger a second point of compromise analysis on the second subset of data; and
   output, to a second computing device and via the communication interface, a first notification comprising a first result of the first point of compromise analysis and a second notification comprising a second result of the second point of compromise analysis,
   wherein the first set of data, the second set of data, the third set of data, the first subset of data, and the second subset of data each comprise a list of one or more devices.

2. The system of claim 1, wherein performing the first point of compromise analysis comprises:
   determining whether a number of devices that are stored in both the first subset of data and a data module within the third set of data is above a predetermined threshold; and
   calculating, responsive to determining that the number of devices is above the predetermined threshold, a point of compromise score.

3. The system of claim 2, wherein calculating the point of compromise score comprises analyzing a record of each device that is stored in both the first subset of data and the data module within the third set of data.

4. The system of claim 1, wherein performing the second point of compromise analysis comprises:
   retrieving a record for each device in the second subset of data for a first time interval;
   extracting locations for each purchase in each record for each device in the second subset of data for the first time interval;
   determining whether a number of devices from the second subset of data that had at least one purchase at a common location of the extracted locations during the first time interval is above a predetermined threshold; and
   generating, responsive to determining that the number of devices is above the predetermined threshold, a first list comprising each device from the second subset of data that had at least one purchase at the common location.

5. The system of claim 4, wherein the memory stores additional computer-readable instructions that, when executed by the at least one processor, further cause the system to:
   calculate, responsive to determining that the number of devices is above the predetermined threshold, a point of compromise score.

6. The system of claim 5, wherein calculating the point of compromise score comprises evaluating, for each device in the first list, a total number of purchases for that device for the first time interval.

7. The system of claim 4, wherein the memory stores additional computer-readable instructions that, when executed by the at least one processor, further cause the system to:
   determine, responsive to determining that the number of devices is not above the predetermined threshold, whether the first time interval is equal to a maximum time interval;
   responsive to determining that the first time interval is not equal to the maximum time interval, increase the first time interval; and
   perform the second point of compromise analysis using the increased first time interval.

8. The system of claim 1, wherein the first point of compromise analysis and the second point of compromise analysis are performed in parallel.

9. A method, comprising:
   at a first computing platform comprising at least one processor, a communication interface, and memory:
     receiving, from a first computing device and via the communication interface, a potential compromise event and a first set of data associated with the potential compromise event;
     extracting, from a central server and via the communication interface, a second set of data that is associated with the potential compromise event;

comparing the first set of data and the second set of data with a third set of data that is stored in a central database to generate a first subset of data and a second subset of data by:
  determining a first list of devices, wherein each device in the first list of devices is stored in the third set of data and at least one of the first set of data and the second set of data;
  determining a second list of devices, wherein each device in the second list of devices is stored in at least one of the first set of data and the second set of data, but is not stored in the third set of data;
  storing the first list of devices in the first subset of data; and
  storing the second list of devices in the second subset of data; and
responsive to generating the first subset of data, triggering a first point of compromise analysis on the first subset of data and the third set of data that is stored in the central database;
responsive to generating the second subset of data, triggering a second point of compromise analysis on the second subset of data; and
outputting, to a second computing device and via the communication interface, a first notification comprising a first result of the first point of compromise analysis and a second notification comprising a second result of the second point of compromise analysis,
wherein the first set of data, the second set of data, the third set of data, the first subset of data, and the second subset of data each comprise a list of one or more devices.

10. The method of claim 9, wherein performing the first point of compromise analysis comprises:
  determining whether a number of devices that are stored in both the first subset of data and a data module within the third set of data is above a predetermined threshold; and
  calculating, responsive to determining that the number of devices is above the predetermined threshold, a point of compromise score.

11. The method of claim 10, wherein calculating the point of compromise score comprises analyzing a record of each device that is stored in both the first subset of data and the data module within the third set of data.

12. The method of claim 9, wherein performing the second point of compromise analysis comprises:
  retrieving a record for each device in the second subset of data for a first time interval;
  extracting locations for each purchase in each record for each device in the second subset of data for the first time interval;
  determining whether a number of devices from the second subset of data that had at least one purchase at a common location of the extracted locations during the first time interval is above a predetermined threshold; and
  generating, responsive to determining that the number of devices is above the predetermined threshold, a first list comprising each device from the second subset of data that had at least one purchase at the common location.

13. The method of claim 12, further comprising calculating, responsive to determining that the number of devices is above the predetermined threshold, a point of compromise score.

14. The method of claim 13, wherein calculating the point of compromise score comprises evaluating, for each device in the first list, a total number of purchases for that device for the first time interval.

15. The method of claim 12, further comprising:
  determining, responsive to determining that the number of devices is not above the predetermined threshold, whether the first time interval is equal to a maximum time interval;
  increasing, responsive to determining that the first time interval is not equal to the maximum time interval, the first time interval; and
  performing the second point of compromise analysis using the increased first time interval.

16. One or more non-transitory computer-readable media storing instructions that, when executed by a computer system comprising at least one processor and memory, cause the computer system to:
  receive, from a first computing device and via a communication interface, a potential compromise event and a first set of data associated with the potential compromise event;
  extract, from a central server and via the communication interface, a second set of data that is associated with the potential compromise event;
  compare the first set of data and the second set of data with a third set of data that is stored in a central database to generate a first subset of data and a second subset of data by:
    determining a first list of devices, wherein each device in the first list of devices is stored in the third set of data and at least one of the first set of data and the second set of data;
    determining a second list of devices, wherein each device in the second list of devices is stored in at least one of the first set of data and the second set of data, but is not stored in the third set of data;
    storing the first list of devices in the first subset of data; and
    storing the second list of devices in the second subset of data; and
  responsive to generating the first subset of data, trigger a first point of compromise analysis on the first subset of data and the third set of data that is stored in the central database;
  responsive to generating the second subset of data, trigger a second point of compromise analysis on the second subset of data; and
  output, to a second computing device and via the communication interface, a first notification comprising a first result of the first point of compromise analysis and a second notification comprising a second result of the second point of compromise analysis,
  wherein the first set of data, the second set of data, the third set of data, the first subset of data, and the second subset of data each comprise a list of one or more devices.

* * * * *